July 4, 1933.     L. G. COPEMAN     1,916,857
CLOSURE MEMBER AND METHOD OF FORMING AND APPLYING
Filed July 2, 1930
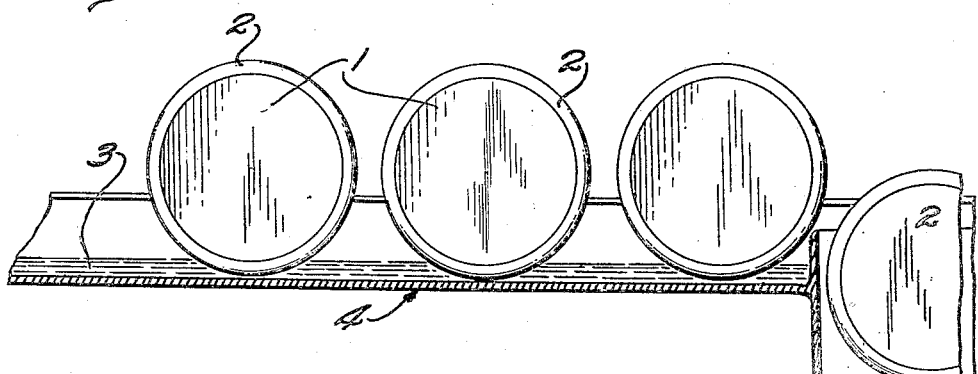
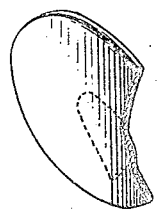
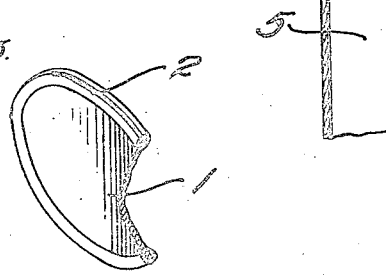
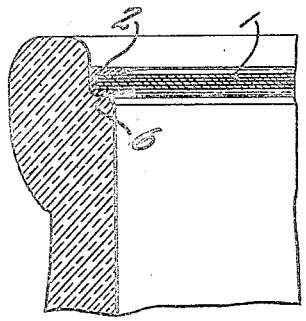
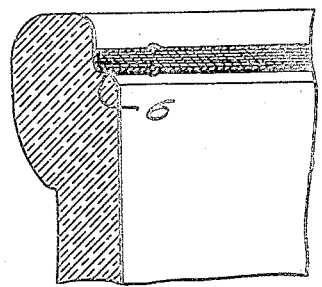
Inventor
LLOYD G. COPEMAN.
By *Barnes & Kisselle*
Attorney Patented July 4, 1933

1,916,857

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

CLOSURE MEMBER AND METHOD OF FORMING AND APPLYING

Application filed July 2, 1930. Serial No. 465,388.

This invention relates to a closure member and method of forming and applying, and has to do particularly with a novel manner of fabricating or treating the periphery of a milk bottle cap whereby to obtain a positive seal when applied to the mouth of a milk bottle.

The positive sealing of milk bottles and similar articles has long presented a very serious problem. A common method of obtaining such sealing is by providing a completely separate hood or cap for covering the entire top of the bottle in addition to the ordinary milk bottle cap, and such hoods or caps have been formed of paper, latex, and other materials.

It is the object of the present invention to preferably utilize only the common paper disc milk bottle cap and treat the periphery of the same in such a way as to present an elastic distortable edge for contact with the mouth of the bottle. More specifically, the present invention resides in a milk bottle cap the periphery of which is relatively deformable and preferably slightly larger in diameter than the opening in the milk bottle with the result that when the cap is inserted in place such deformable periphery adapts itself to any irregularities in the neck of the bottle and is also slightly deformed so as to provide a positive seal.

A further feature of the invention resides in the method of forming the elastic periphery on the cap and this is preferably accomplished by either forming an annular ring of latex or similar material around the periphery of the cap or by coating all surfaces of the cap with such latex or similar material.

In the drawing:

Fig. 1 is a more or less diagrammatic view illustrating one method of applying an annular ring of latex to the milk bottle caps.

Fig. 2 is a perspective view, partly cut away, of a cap all of the surfaces of which are coated with a layer of elastic material.

Fig. 3 is a perspective view, partly cut away, of a milk bottle cap formed in accordance with the method shown in Fig. 1.

Fig. 4 is an enlarged fragmentary sectional view illustrating the sealed joint obtained by applying a cap such as shown in Fig. 3 to a milk bottle.

Fig. 5 is a view similar to Fig. 4 but showing the cap, such as shown in Fig. 2, as applied to a milk bottle.

The gist of the present invention resides in the provision of a milk bottle cap or similar article whose periphery is formed of a material which is relatively easily deformable as compared to the main body of the disc. The main result obtained is positive sealing by means of a relatively inexpensive closure member. The paper disc represents a very inexpensive closure member for milk bottles and while many different types and forms of milk bottle caps have been designed the present invention is applicable to all of such inexpensive caps regardless of any peculiar characteristics thereof.

I prefer to use latex in carrying out the present invention because of its cheapness and ease of application, but it will be understood that other similar materials or other types of rubber may be used without materially increasing the cost of the closure member. The latex used in carrying out the present invention may be latex in its commercial form, provided with the desired accelerators, or such latex may be diluted to different extents in accordance with the sealing qualities desired.

The preferred form of carrying out the present invention is that illustrated by Fig. 1 wherein any standard cap as at 1 may be held by any suitable means (not shown) whereby the periphery of the cap is subjected to a coating 2 of liquid latex. This latex may be applied by maintaining a body 3 of the latex in a trough 4 in which case the means holding the respective discs or caps will be such as to permit rotation of the caps so that the latex is applied as an annular ring, as shown at 2. It will be obvious that any suitable means may be utilized for actuating the discs so as to coat around their periphery.

When the periphery of the cap has been coated with the layer of latex it may be subjected to temperature so as to quickly vulcanize and fix the same. In Fig. 1 I have illustrated as at 5 a receptacle which may be of such length and maintained at such temperature that when the cap 2 with its annular ring of latex passes through the same it will be vulcanized and in condition to be immediately handled. The milk bottle caps or other closure members are preferably of standard dimensions, particularly the diameter thereof, so that the thin coating of latex or other resilient material will be slightly compressed or else snugly fit any depression or cavity in the milk bottle surface.

In coating just the periphery of the cap with latex the uncoated surfaces of the cap may be paraffined or similarly treated in the standard manner. In coating all the surfaces of the cap, as shown in Fig. 2, such cap may be initially a plain uncoated paper cap or the like and the coating of latex or similar material may be sprayed thereon or the cap may be dipped if desired. Such sprayed or dipped caps may be subjected to temperature so as to quickly vulcanize the same or they may be air dried and air vulcanized.

The latex or other material applied to the periphery or the entire surface of the cap may be colored any color desired or may be left the natural color of the latex or other material. In either the form shown in Fig. 4 or Fig. 5 it will be obvious that there will be a layer of resilient elastic material between the cap and the shoulder 6 of the bottle so that an additional seal will be obtained at this point in addition to the peripheral seal around the edge of the cap. As the caps in all milk bottles are held in place by friction, it will be obvious that this resilient layer of latex will be compressed and held in contact against the shoulder 6 by the same friction which holds the cap in place.

It will thus be seen that I have provided a closure for milk bottles and the like which, by means of its elastic distortable periphery makes it possible to positively seal the bottle by use of a single closure member. In other words, the milk cap itself can now be utilized to accomplish the same function as the separate hood or cap member. As the bottle is positively sealed none of the contents can leak out and thus the main danger of contamination of milk bottles is eliminated. In case where an annular ring of resilient material is applied to the cap, as shown in Fig. 3, very little expense is added to the cap because of the relatively low cost of latex and the simple method in which it is applied. In a case where the entire cap is coated, as shown in Figs. 2 and 5, then the cost of the final cap is substantially the same as the standard paraffin cap as the use of paraffin is eliminated and latex takes its place. The cost of applying latex would be approximately the same as coating the cap with paraffin.

What I claim is:

1. A closure member for milk bottles and the like formed of relatively stiff paper having a coating of elastic material around the periphery thereof, said material being deposited from an aqueous dispersion of rubber.

2. A closure member for milk bottles or the like having a main body of relatively rigid paper and a coating of relatively deformable material deposited from an aqueous dispersion of rubber around the periphery and lower edge thereof.

3. A closure member for milk bottles or the like having a main body of relatively rigid paper and a coating of latex around the periphery and lower edge thereof.

4. A closure member for milk bottles or the like having a body of paper and a layer of latex around the periphery thereof.

5. The method of forming milk bottle caps and the like out of relatively stiff paper and having a deformable surface as a part thereof which comprises coating a portion of the cap with a layer of latex.

6. The method of forming milk bottle caps and the like out of relatively stiff paper and having a deformable surface as a part thereof which comprises coating the periphery and adjacent edges of the cap with a layer of latex.

7. The method of forming milk bottle caps and the like to provide a deformable surface as a part thereof which comprises coating the periphery of the cap with a layer of latex by dipping the periphery into liquid latex, and then passing said coated cap through a heated chamber to vulcanize the same.

8. The method of forming milk bottle caps and the like to provide a deformable surface as a part thereof which comprises coating the periphery of the cap with a layer of latex by dipping the periphery into liquid latex, and passing the cap through a heated chamber of sufficient length to vulcanize and prepare the same for immediate handling.

9. The method of forming a milk bottle cap to provide one or more deformable surfaces for engaging the milk bottle, which comprises coating a plain paper cap with a layer of latex.

10. The method of closing milk bottles with a single closure member made of relatively stiff paper whereby to positively seal the same, which comprises coating the surfaces of the closure member, adapted to contact with a surface or surfaces of the milk bottle, with a layer of elastic deformable material.

In testimony whereof I affix my signature.

LLOYD G. COPEMAN.